United States Patent [19]

Fuji et al.

[11] Patent Number: 5,010,540

[45] Date of Patent: Apr. 23, 1991

[54] APPARATUS FOR RECORDING AND REPRODUCING INFORMATION ON AND FROM AN OPTICAL DISK

[75] Inventors: Hiroshi Fuji; Tsuneo Fujiwara, both of Tenri; Takashi Iwaki, Nara; Tomiyuki Numata, Tenri; Kentaroh Tsuji, Nara; Shigemi Maeda, Yamatokohriyama; Takeshi Yamaguchi, Nara; Kunio Kojima, Nara; Toshihisa Deguchi, Nara; Shigeo Terashima, Tenri, all of Japan

[73] Assignee: Sharp Kabushiki Kaisha, Osaka, Japan

[21] Appl. No.: 225,892

[22] Filed: Jul. 29, 1988

[30] Foreign Application Priority Data

Jul. 31, 1987 [JP] Japan .............................. 62-193119
Jan. 22, 1988 [JP] Japan .............................. 63-13194

[51] Int. Cl.[5] .................. G11B 15/52; G11B 27/22
[52] U.S. Cl. .............................................. 369/50
[58] Field of Search .................... 369/32, 50, 111, 47, 369/48; 360/73.03

[56] References Cited

U.S. PATENT DOCUMENTS

| | | | |
|---|---|---|---|
| 3,814,844 | 6/1974 | Waldspurger et al. . | |
| 4,207,440 | 6/1980 | Schiffman . | |
| 4,390,977 | 6/1983 | Onigata et al. | 369/50 |
| 4,404,604 | 9/1983 | Ueki et al. . | |
| 4,672,595 | 6/1987 | Senso | 369/50 |
| 4,757,488 | 7/1988 | Nagai et al. | 369/50 |
| 4,766,502 | 8/1988 | Mashimo | 369/50 X |

FOREIGN PATENT DOCUMENTS

| | | |
|---|---|---|
| 30184195 | 6/1986 | European Pat. Off. . |
| 54-97705 | 7/1979 | Japan . |
| 55-140757 | 10/1980 | Japan . |
| 2069186 | 8/1981 | United Kingdom . |
| 2089533 | 6/1982 | United Kingdom . |

*Primary Examiner*—Donald McElheny, Jr.

[57] ABSTRACT

An apparatus for recording and reproducing information on and from an optical disk includes a first control for producing a first control signal for controlling the rotational speed of a rotational driving apparatus, on the basis of the detected radial position; a judging apparatus which judges whether or not the reproduced signals are reproduced from a recorded region of the optical disk; a second control for producing a second control signal for controlling the rotational speed of the rotational driving apparatus, on the basis of the signals reproduced from the disk; and a switch apparatus which switches the circuit so that the rotational driving apparatus is controlled by the first control signal when the reproduced signals are not reproduced from a non-recorded region, and controlled by the second control signal when the reproduced signals are reproduced from a recorded region.

5 Claims, 10 Drawing Sheets

APPARATUS FOR RECORDING AND REPRODUCING INFORMATION ON AND FROM AN OPTICAL DISK

BACKGROUND OF THE INVENTION

1. Field of the Invention

This invention relates to an apparatus for recording and reproducing information on and from a recording medium such as an optical disk, and in particular to an apparatus for recording and reproducing information on and from a recording medium which can accurately and stably control the rotational speed of the recording medium.

2. Description of the Background of the Invention

An apparatus for recording and reproducing on and from an optical disk, an apparatus using a magnetooptical disk, an apparatus using a write-once type optical disk, and an apparatus using a phase-transfer type optical disk are known. In all of these apparatus, information is recorded on or reproduced from an optical disk along tracks which are formed concentrically or spirally on the disk, while rotating the optical disk.

For example, the apparatus for recording and reproducing from a magnetooptical disk uses a magnetooptical disk as a recording medium in which the recording portion consists of a magnetic film having the axis of easy magnetization perpendicular to the film face. When recording information on the disk, an energy beam such as a laser beam focused to a diameter of about 1 $\mu m$ is irradiated on the film to raise the temperature of a region of the film along a track, and the magnetization of the heated region is reversed by applying an external magnetic field. When information is to be reproduced from the disk, using photomagnetic effect between the linear polarlization of a laser beam and the magnetic film, a laser beam is scanned on the disk, and the change in the polarized direction of the light reflected from or transmitted through the magnetic film is analyzed by an analyzer, and converted to a series of electrical signals.

In such an apparatus, the rotational speed of the magnetooptical disk is controlled so that the linear velocity of the region irradiated by the laser beam is kept constant (hereinafter, this control is referred to as "CLV control"). Conventionally, the CLV control is conducted by either of the two control processes described below.

In the first control process, the rotational speed of the magnetooptical disk is detected by a rotation frequency generator such as a tachometer or rotary encoder attached to a spindle motor which drives the magnetooptical disk. The radial position of the irradiated region (hereinafter, referred to as "radial tracking position") is detected by a position sensor such as an optical encoder or potentiometer attached to an optical head which receives the reflected or transmitted light. The objective rotational speed is determined from the detected radial tracking position. Then, the control of the rotational speed of the disk is conducted by taking the feedback difference between the detected rotational speed and the objective rotational speed. The first control process is characterized in that the CLV control is conducted by obtaining the objective rotational speed from the detected radial tracking position.

In the second control process, a magnetooptical disk is used in which ordinary signals for recording information as well as mark signals such as clock pulses were recorded under a constant predetermined linear velocity. When information is reproduced from the disk, both the mark signals and information signals are reproduced, and the frequency or phase relation of the reproduced mark signals are detected from the detected signals to obtain the linear velocity of the irradiated region. Then, the control of the rotational speed of the disk is conducted by taking the feedback difference between the detected rotational speed and the objective rotational speed. For example, in the CLV control for a so-called compact disk, the linear velocity is detected from a frame synchronizing signal which are included in the reproduced signals.

An apparatus for recording and reproducing on and from an optical disk of the prior art in which information can be recorded, reproduced and erased by either of the aforementioned control processes has a drawback that the reliability of the reproduced signals deteriorates because the recording portion of such an optical disk consists of a part of the recording portion (hereinafter, referred as "recorded region") where information has been already recorded, and the other part of the recording portion (hereinafter, referred as "non-recorded region") where information has not yet been recorded. This will be described in more detail below.

When a laser beam is scanned on a recorded region, according to the first control process, the output signal of the rotary frequency generator and the detected information signals are different from each other in frequency or phase, resulting in a variation of the frequency or phase of the reproduced signal. Therefore, the first control process cannot accurately control the linear velocity of the region to be scanned. In contrast, the second control process can perform a reliable control of the linear velocity of the region to be scanned because the control is effected on the basis of the signals detected from the mark signals.

When a laser beam is scanned on the non-recorded region, the first control process can control accurately and stably the linear velocity of the non-recorded region because the first control process does not use mark signals. By contrast, in the second control process, no information or data required for controlling the linear velocity can be obtained, resulting in a runaway of the spindle motor.

Hence, a prior art apparatus for recording and reproducing information on and from an optical disk such as a magnetooptical disk, in which apparatus either of the two control processes is conducted, cannot accurately and stably control the linear velocity of a region to be scanned so that the reliability of the reproduced signals is lowered.

The timing control for recording, reproducing or erasing information may be conducted as described below. As shown in FIG. 13, a regenerative circuit 31 supplies a reproduced signal A to a sector timing detection circuit 32. In the sector timing detection circuit 32, for example, synchronization detection can be performed at each sector, for example, using a signal such as a sector mark signal which is included in the reproduced signal A. A synchronization detection signal B from the sector timing detection circuit 32 is supplied to a timing control circuit 33 in which the timing control is performed on the basis of the synchronization detection signal B. When reproducing information, a reproduction timing signal D is sent to the regenerative circuit 31, and when recording or erasing information, a recording/erasing timing signal E is sent to a recording/erasing circuit 34. The sector timing detection circuit 32 conducts the synchronization detection separately from the reproduction of information so that the synchronization detection is not disturbed by the reproduction timing signal D.

In the apparatus shown in FIG. 13, the timing control is performed on the basis of only the synchronization detection signal B. If the synchronization detection is erroneously conducted, or if a time lag in detection is produced in the sector timing detection circuit 32, the timing control cannot be performed accurately. For example, the timing control is disturbed in such a case that a read gate signal of a PLL (Phase Locked Loop) becomes inaccurate, that a capturing action becomes impossible, or that the unlocking easily occurs. Such an apparatus for recording and reproducing information from an optical disk has drawbacks that the reliability in the recording, reproduction or erasing of information is lowered, and that the timing control such as an AGC (Automatic Gain Control) is hindered.

SUMMARY OF THE INVENTION

The apparatus for recording and reproducing information on and from an optical disk of the invention, which overcomes the above-discussed and numerous other disadvantages and deficiencies of the prior art, includes an optical head, the optical disk being irradiated by a light beam while being rotated by a rotational driving apparatus, a reproduction device which reproduces the information recorded on the optical disk to output reproduced signals, a position detection apparatus which detects the radial position of a region of the disk irradiated by the light beam, a first control which produces a first control signal for controlling the rotational speed of the rotational driving apparatus, on the basis of the detected radial position, a judging device which judges whether or not the reproduced signals are reproduced from a region of the optical disk where information has been already recorded, a second control which produces a second control signal for controlling the rotational speed of the rotational driving apparatus, on the basis of the reproduced signals, and a switch which switches the circuit so that the rotational driving apparatus is controlled by the first control signal when the reproduced signals are not reproduced from a region where information has been already recorded and controlled by the second control signal when the reproduced signals are reproduced from a region where information has been already recorded.

In a preferred embodiment, the apparatus further includes a rotational speed detection apparatus which detects a rotational speed of the rotational driving apparatus, and the first control produces the first control signal on the basis of the detected radial position and the detected rotational speed.

In a preferred embodiment, the detecting apparatus receives the reproduced information signal from the reproduction device, and detects from said reproduced signals a region of said optical disk where information has been already recorded.

In a preferred embodiment, the detecting apparatus includes a retriggable pulse generation circuit.

In a preferred embodiment, the detecting apparatus further includes a circuit which invalidates a top portion of said reproduced signals.

Thus, the invention described herein makes possible the objects of (1) providing an apparatus for recording and reproducing information on and from an optical disk which can reproduce information accurately and stably; (2) providing an apparatus for recording and reproducing information on and from an optical disk which can conduct accurately and stably the CLV control; and (3) providing an apparatus for recording and reproducing information on and from an optical disk which can reproduce information signals of high quality.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
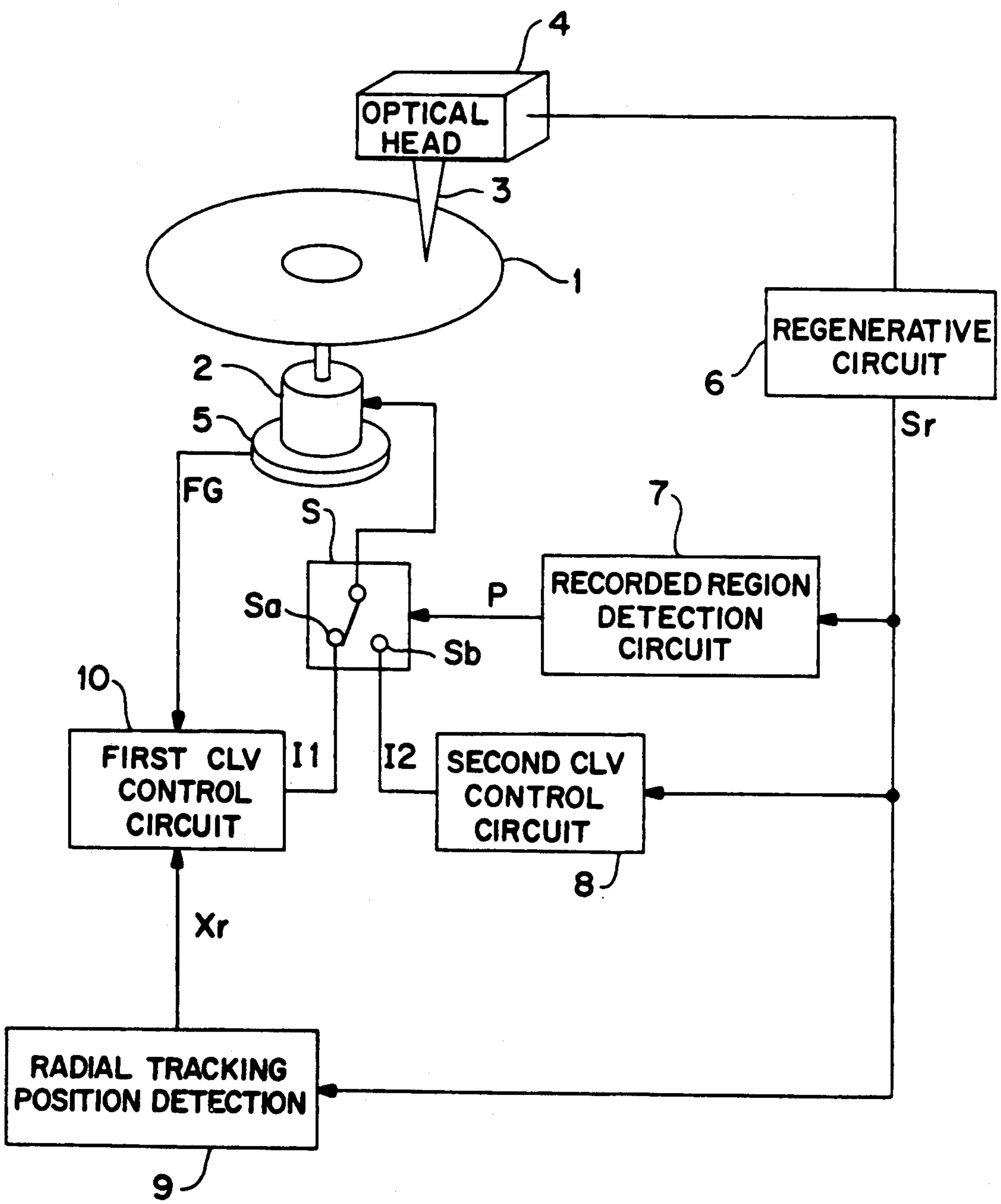
FIG. 1 is a block diagram of an apparatus for recording and reproducing information on and from an optical disk according to the invention.

FIG. 1 shows diagrammatically an embodiment of the invention. The embodiment of FIG. 1 is an apparatus for recording and reproducing information on and from a magnetooptical disk. The device includes a spindle motor 2 rotatively driving the magnetooptical disk 1, and an optical head 4 which irradiates a laser beam 3 on the disk 1 for detecting the light reflected from the disk 1. In the magnetooptical disk 1, information for detecting the radial tracking position was previously recorded in the form of convexo-concave patterns engraved when manufacturing the disk 1. The detection of the radial tracking position during recording, reproducing and erasing operations is conducted by reproducing the information. More specifically, the lengths of the convexo-concave patterns are counted using clock pulses, and the information is reproduced from the counted number of the clock pulses. When such engraved convexo-concave patterns are not formed in the disk 1, the detection of the radial tracking position can be performed using a position sensor. For example, a variable resistor is attached to the head 4 so that the resistance varies in accordance with the radial tracking position. Alternatively, an optical encoder may be attached to the head 4. The optical encoder produces a number of pulses the is proportional to the moving distance of the head 4. Such a so-called linear sensor can detect a radial tracking position in the whole area of the disk 1 and at any linear velocity, but the level of its detection accuracy is low. In contrast, the detection of a radial tracking position in which previously-recorded convexo-concave patterns are reproduced can precisely detect a radial tracking position, but the detection should be conducted under the condition that the region to be detected rotates at a linear velocity within a predetermined very narrow range. In this example, therefore, a coarse rotational control is conducted on the basis of the signal obtained from the linear sensor to position the head 4 in the approximate region to be detected. Thereafter, the rotational speed is reduced to a predetermined range so that a fine rotational control is conducted on the basis of information reproduced from the convexo-concave patterns in the region to be detected. A rotary frequency generator 5 such, as a tachometer, rotary encoder or the like is connected to one end of the spindle motor 2. The rotary frequency generator 5 is electrically connected to a first CLV control circuit 10.

The apparatus shown in FIG. 1 further includes a regenerative circuit 6, a recorded region detection circuit 7, a second CLV control circuit 8, a radial tracking position detection circuit 9, and a switch S.

The recorded region detection circuit 7 which functions as a judge includes an amplitude detection circuit and a comparator. The detection circuit 7 outputs a high level signal when the output Sr of the regenerative circuit 6 is the signal reproduced from the recorded region, and outputs a low level signal when the output Sr of the circuit 6 is a signal reproduced from the non-recorded region. Alternatively, the output level of the detection circuit 7 may be changed by reading out the reproduced information. The recorded region detection circuit 7 will be described later in more detail.

The radial tracking position detection circuit 9 detects the information regarding the radial tracking position which is included in the output Sr of the regenerative circuit 6. The output Xr of the radial tracking position detection circuit 9 is supplied to the first CLV control circuit 10.

The output of the first CLV control circuit 10 is connected to a terminal Sa of the switch S, and the output of the second CLV control circuit 8 to another terminal Sb of the switch S.

Figure 2:
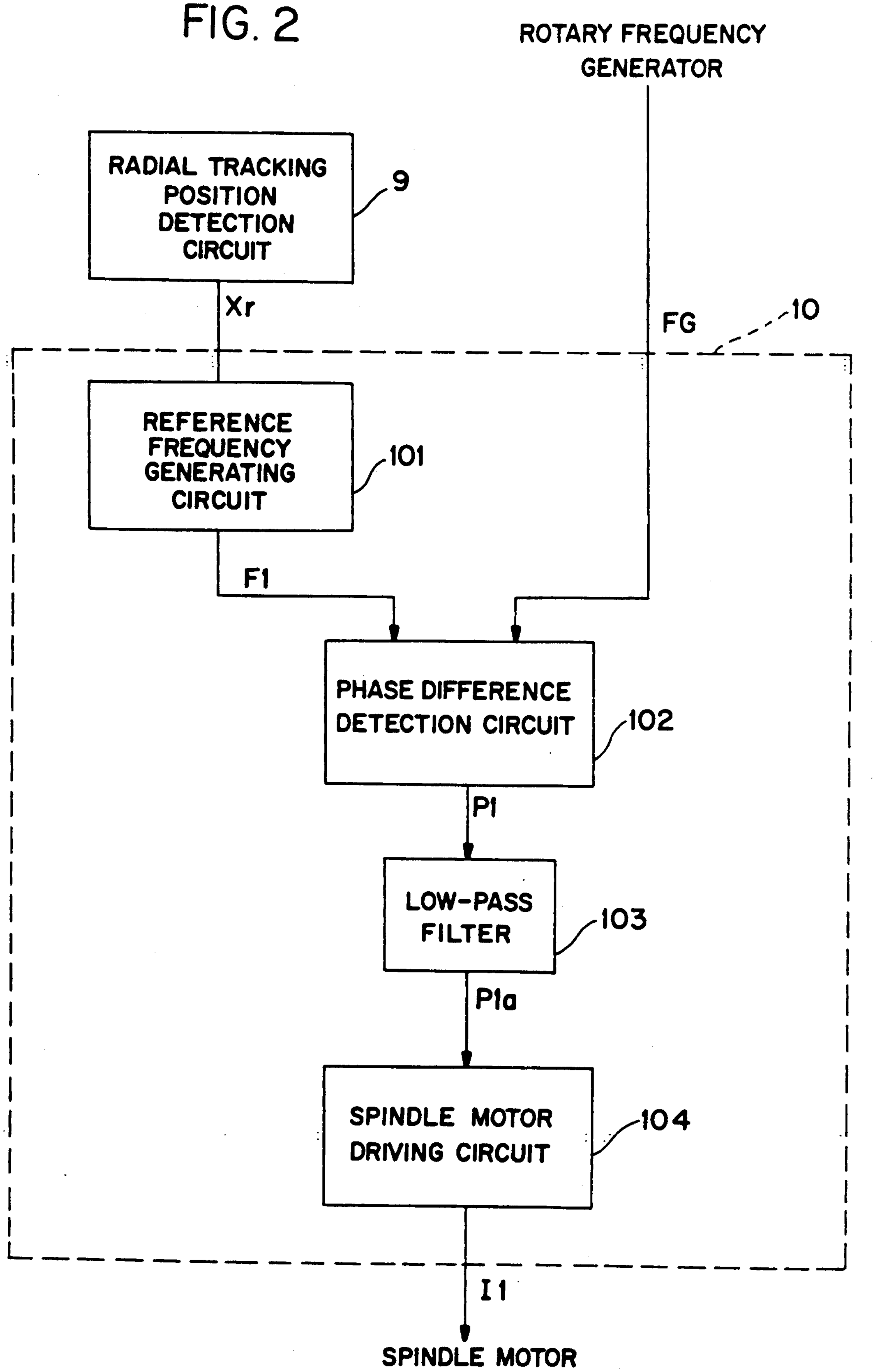
FIG. 2 is a block diagram of the first CLV control circuit in the apparatus shown in FIG. 1.

FIG. 2 shows a block diagram of the first CLV control circuit 10. A reference frequency generating circuit 101 is supplied the output signal (positional information) Xr of the radial tracking position detection circuit 9 which generates a clock $F_1$ of a reference frequency corresponding to the radial position. The frequency of the clock $F_1$ varies in proportional to the objective rotational speed which corresponds to the radial position of the optical head 4. The clock $F_1$ is supplied to a phase difference detection circuit 102. The output FG of the rotary frequency generator 5 is supplied to the detection circuit 102. The phases of these signals $F_1$ and FG are compared to each other in the detection circuit 102 to produce a phase differece signal $P_1$ which is a pulse having a length proportional to the degree of the phase difference. A low-pass filter 103 converts the phase difference signal $P_1$ to a voltage signal $P_{1a}$ the level of which is proportional to the degree of the phase difference. The voltage signal $P_{1a}$ is converted by a spindle motor driving circuit 104 to a current $I_1$ which drives the spindle motor 2. In other words, the current $I_1$ is controlled so that the phase difference between the signals $F_1$ and FG becomes zero (i.e., the signals $F_1$ and FG coincide with each other in phase and frequency). Therefore, the spindle motor 2 rotates at a rotational speed corresponding to the clock $F_1$.

Figure 3:
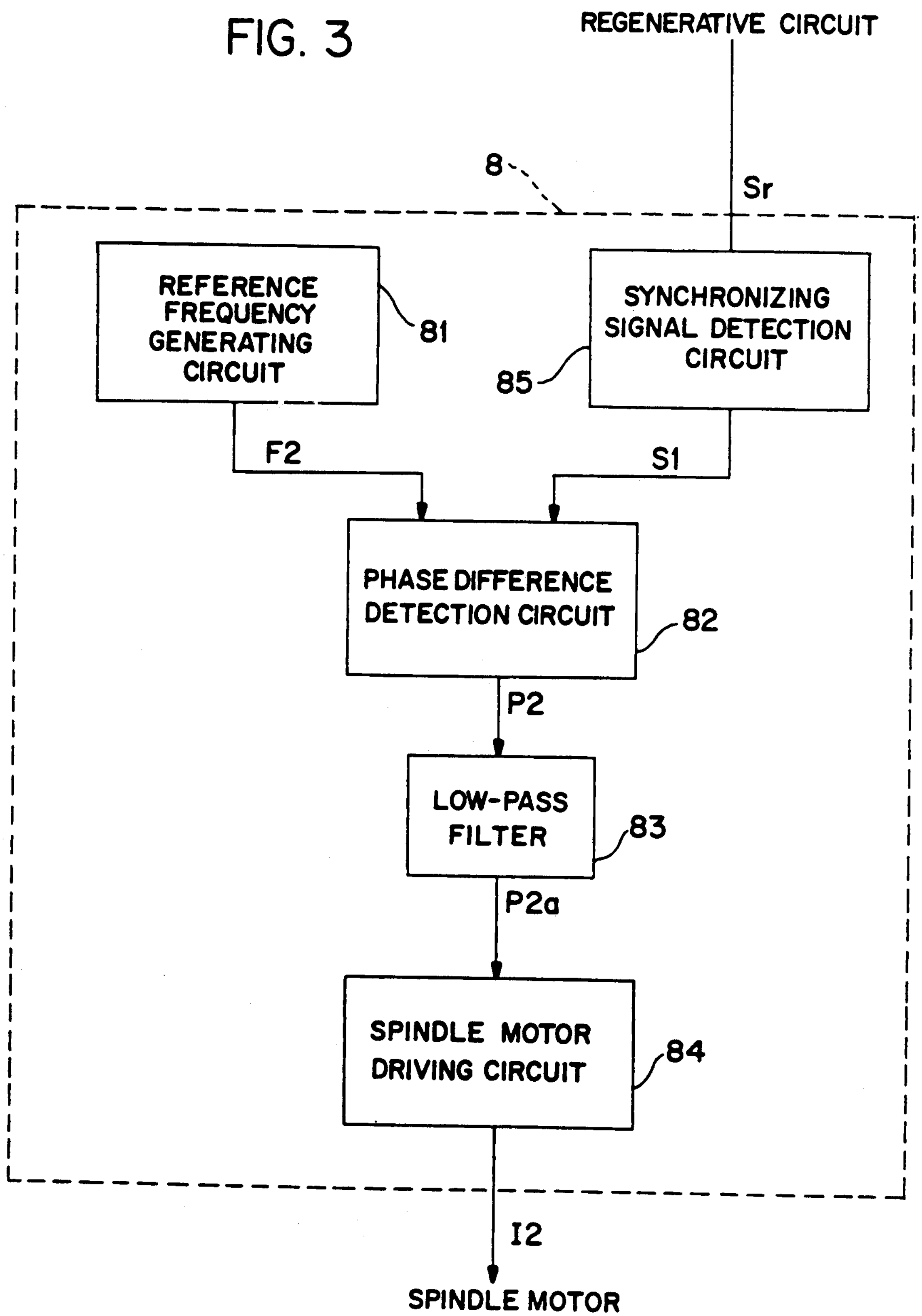
FIG. 3 is a block diagram of the second CLV control circuit in the apparatus shown in FIG. 1.

FIG. 3 shows a block diagram of the second CLV control circuit 8. The second CLV control circuit 8 comprises a reference frequency generating circuit 81 generating a clock $F_2$, a phase difference detection circuit 82, a low-pass filter 83, a spindle motor driving circuit 84, and a synchronizing signal detection circuit 85. The control manner of the second CLV control circuit 8 is basically the same as that of the above-mentioned first CLV control circuit 10 except that the phase difference detection circuit 82 compares the clock $F_2$ with an output $S_1$ of the synchronizing signal detection circuit 85 and that the clock $F_2$ has a frequency of a constant value. The signal Sr supplied from the regenerating circuit 6 contains a synchronizing signal (or a signal equivalent to the synchronizing signal) which will used in the CLV control. As the rotational speed of the spindle motor 2 increase, the frequency of the signal $S_1$ correspondingly increases. Hence, the output $S_1$ functions as the output FG of the rotary frequency generator 5 in the first CLV control circuit 10. Usually, the outputs $S_1$ and FG are greatly different in frequency. Corresponding to this, accordingly, the clocks $F_1$ and $F_2$ also are different in frequency. Furthermore, the characteristics of the low-pass filter 83 differs from those of the low-pass filter 103.

When information is reproduced from the magnetooptical disk 1, the laser beam 3 from the optical head 4 scans the disk 1. The light signal reflected from the disk 1 enters into the optical head 4 to detect the signal recorded on the disk 1. The detected signal or the output of the optical head 4 is amplified and processed in the regenerative circuit 6. The reproduced signal contains mark signals such as information regarding the radial tracking position, clock, etc. The output Sr of the regenerative circuit 6 is sent to the recorded region detection circuit 7, the second CLV control circuit 8, and the radial tracking position detection circuit 9.

When the level of the output P of the detection circuit 7 is low (i.e., when the non-recorded region is scanned by the laser beam 3), the switch S is controlled to position itself at terminal Sa to supply the output current $I_1$ of the first CLV control circuit 10 to the spindle motor 2. As described above, the level of the output current $I_1$ is controlled on the basis of the radial tracking position detected by the detection circuit 9, so that the magnetooptical disk 1 rotates at the objective rotational speed corresponding to the radial tracking position, resulting in rotation at a predetermined linear velocity.

In contrast, when the level of the output P of the detection circuit 7 is High (i.e., when the recorded region is scanned by the laser beam 3), the switch S is controlled to position itself at terminal Sb to supply the output current $I_2$ of the second CLV control circuit 8 to the spindle motor 2. The level of the output current $I_2$ is controlled on the basis of the frequency or phase of the mark signal included in the output signal Sr of the regenerative circuit 6, so that the magnetooptical disk 1 rotates at the objective rotational speed corresponding to the radial tracking position, resulting in the predetermined linear velocity.

According to the invention, the CLV control of an optical disk can be performed accurately and stably in both the recorded region and the non-recorded region of the disk.

Figure 4:
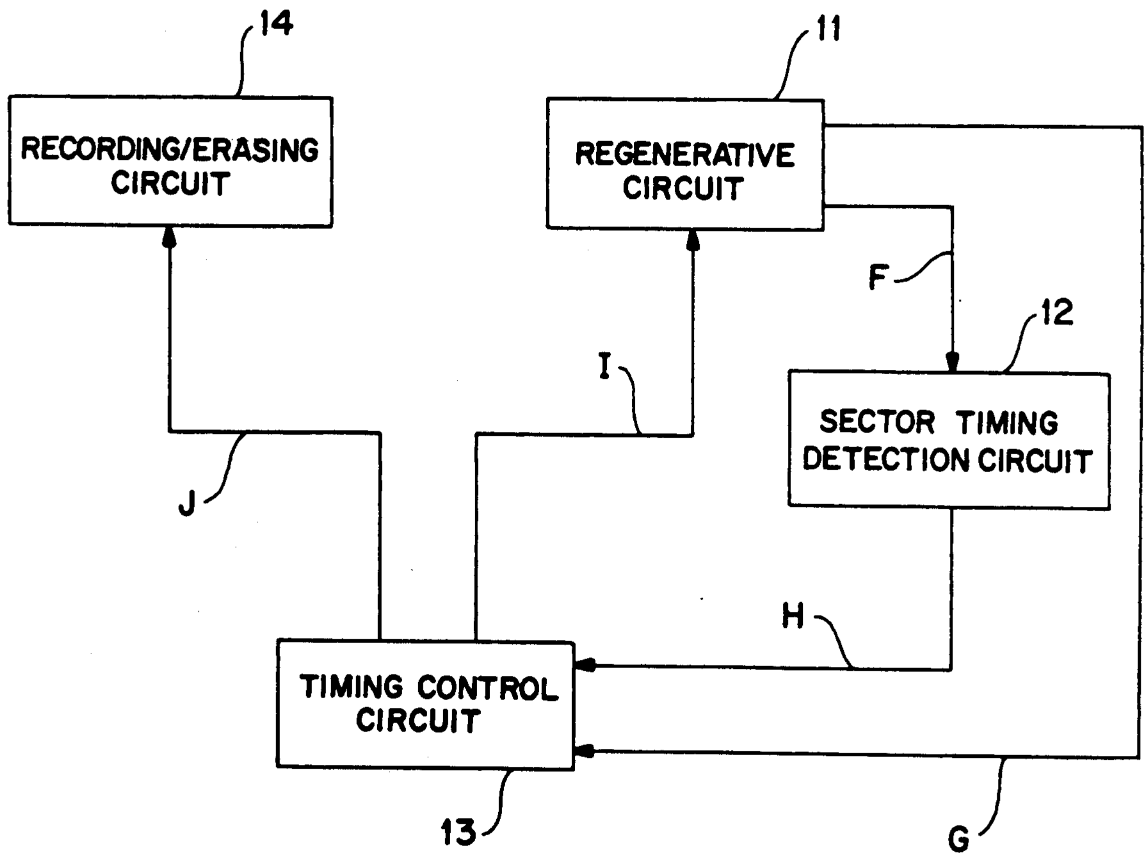
FIG. 4 is a block diagram of an example of the circuit for producing the recorded region detection signal.

FIG. 4 is a block diagram of an example of the circuit arrangement for producing the recorded region detection signal P. This circuit comprises a detection or information regenerative circuit 11 which outputs the reproduction signal F and the recorded region detection signal G. The reproduction signal F is supplied to a sector timing detection circuit 12 which produces the synchronization detection signal H in response to the signal F. A timing control circuit 13 receives the recorded region detection signal G and the synchronization detection signal H, and produces two signals, i.e., the reproduction timing signal I supplied to the information regenerative circuit 11, and the erasing timing signal J supplied to a recording/erasing circuit 14.

Since the recording, reproduction or erasing of information is conducted on the basis of the recorded region detection signal P, the timing of the recording, reproduction and erasing of information can be controlled accurately. The timing control may be performed on the basis of both the recorded region detection signal P and the synchronization detection signal H. In this case, even when the synchronization detection signal becomes inaccurate, the timing control can be conducted accurately on the basis of the recorded region detection signal.

Figure 5:
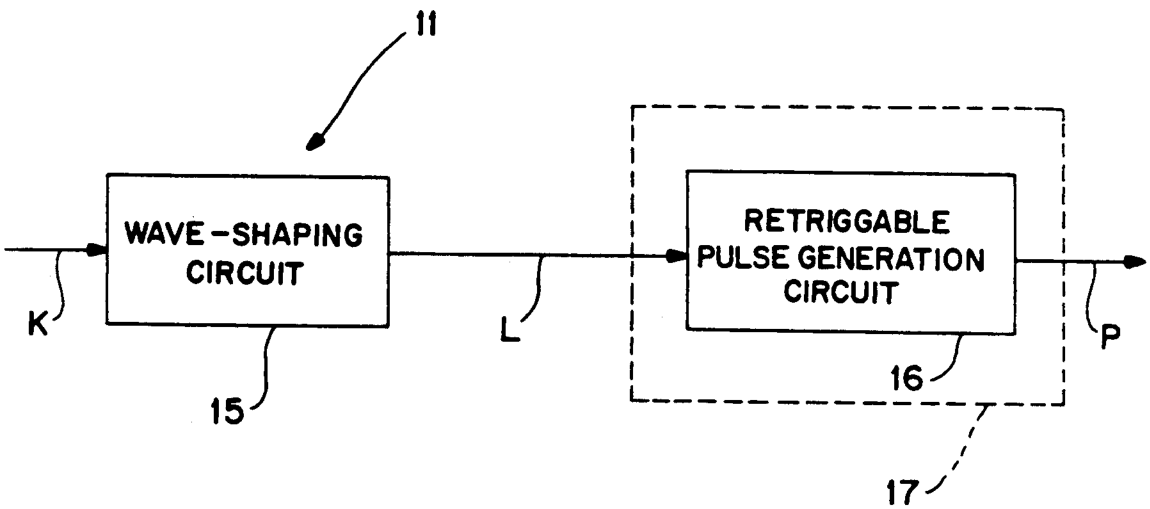
FIG. 5 is a block diagram showing an example of the regenerative circuit used in the circuit of FIG. 4.

The regenerative circuit 11 detects the recorded region, and, as shown in FIG. 5, includes a wave-shaping circuit 15 and a recorded region detecting circuit 17 having a retriggable pulse generation circuit 16. The reproduced analog signal K (FIG. 12(*a*)) which is obtained from the disk 1 is supplied to the wave-shaping circuit 15 to be converted to the reproduced digital signal L (FIG. 12(*b*)) which is a binary-coded signal of High or Low. The binary-coded signal L may be produced by the amplitude detection or peak detection. The recorded region detecting circuit 17 receives the reproduced digital signal L, and outputs the recorded region detection signal P (FIG. 12(*c*)). When a pulse is present in the signal L, the detection signal P is activated to High for $\tau$ seconds. When the next pulse is input to the detection circuit 17 within $\tau$ seconds after the preceding pulse has been input, the detection signal P remains High successively for $\tau$ seconds.

Figure 6:
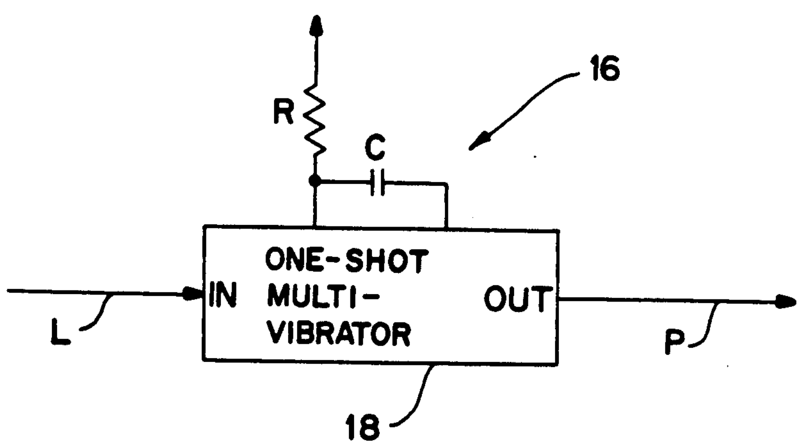
FIGS. 6 to 8 are block diagrams respectively showing an example of the retriggable pulse circuit used in the regenerative circuit of FIG. 5.

FIG. 6 shows an example of the retriggable pulse generation circuit 16. In this example, the circuit 16 consists of a one-shot multivibrator 18. The time $\tau$ during which the recorded region detection signal P is made High is set by the combination of a register R and a capacitor C (i.e., the time $\tau$ is proportional to RC).

Figure 7:
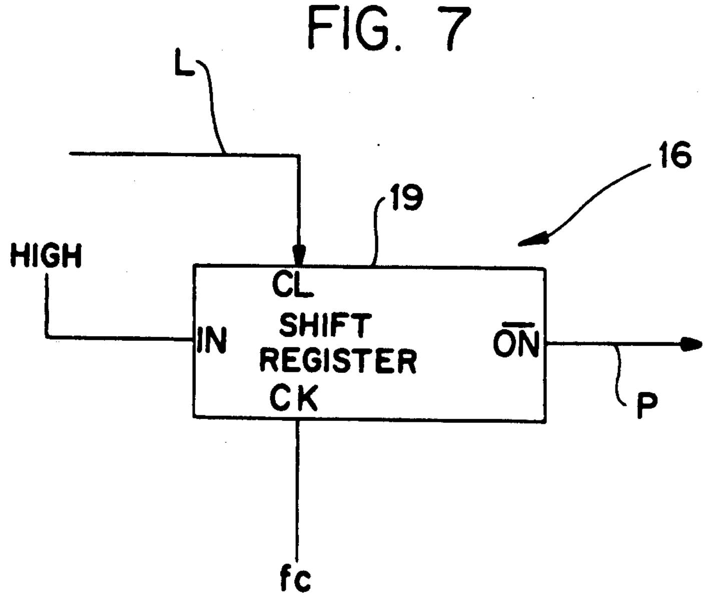

Another example of the retriggable pulse generation circuit 16 is shown in FIG. 7. This example employs a shift register 19 as the retriggable pulse generation circuit 16. In this example, the serial input IN of the register 19 is set to High, and a clock having the frequency of $f_c$ is supplied to the clock terminal CK. The reproduced digital signal L is input to the clear terminal CL. The N-th output of the shift output $\overline{QN}$ is used as the recorded region detection signal P. In this case, the time $\tau$ equals $N \times (1/f_c)$ seconds.

Figure 8:
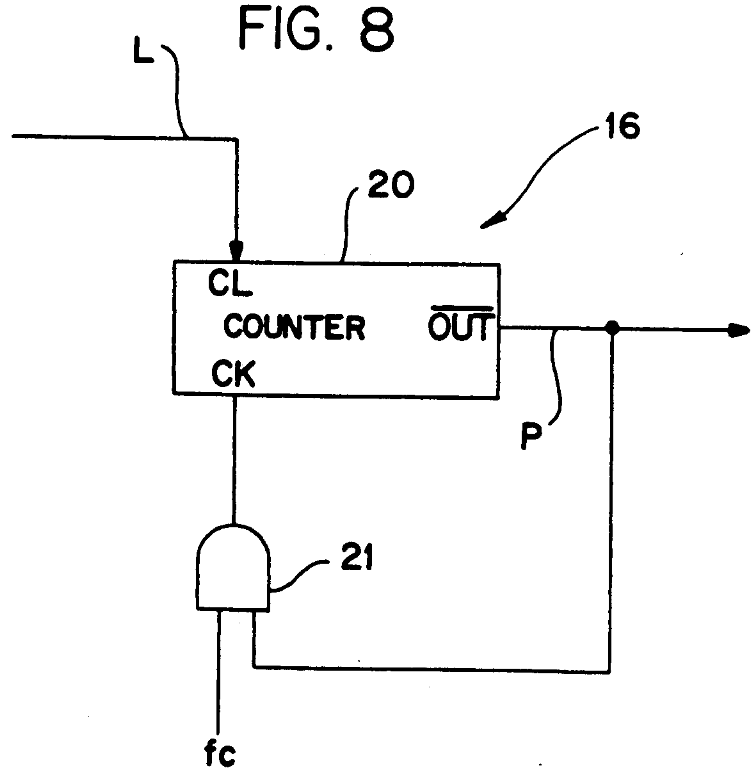

A further example of the retriggable pulse generation circuit 16 is shown in FIG. 8. This example employs a modulo-N divider or counter 20 as the retriggable pulse generation circuit 16. The reproduced digital signal L is input to the clear terminal CL of the divider or counter 20. The output from the output terminal $\overline{OUT}$ is used as the recorded region detection signal P which is also supplied to one input terminal of an AND gate 21. A clock having the frequency of $f_c$ is supplied to the other input terminal of the gate 21. The output of the gate 21 is coupled to the clock terminal CK of the divider or counter 20. The time $\tau$ equals $N \times (1/f_c)$ seconds.

Figure 12:
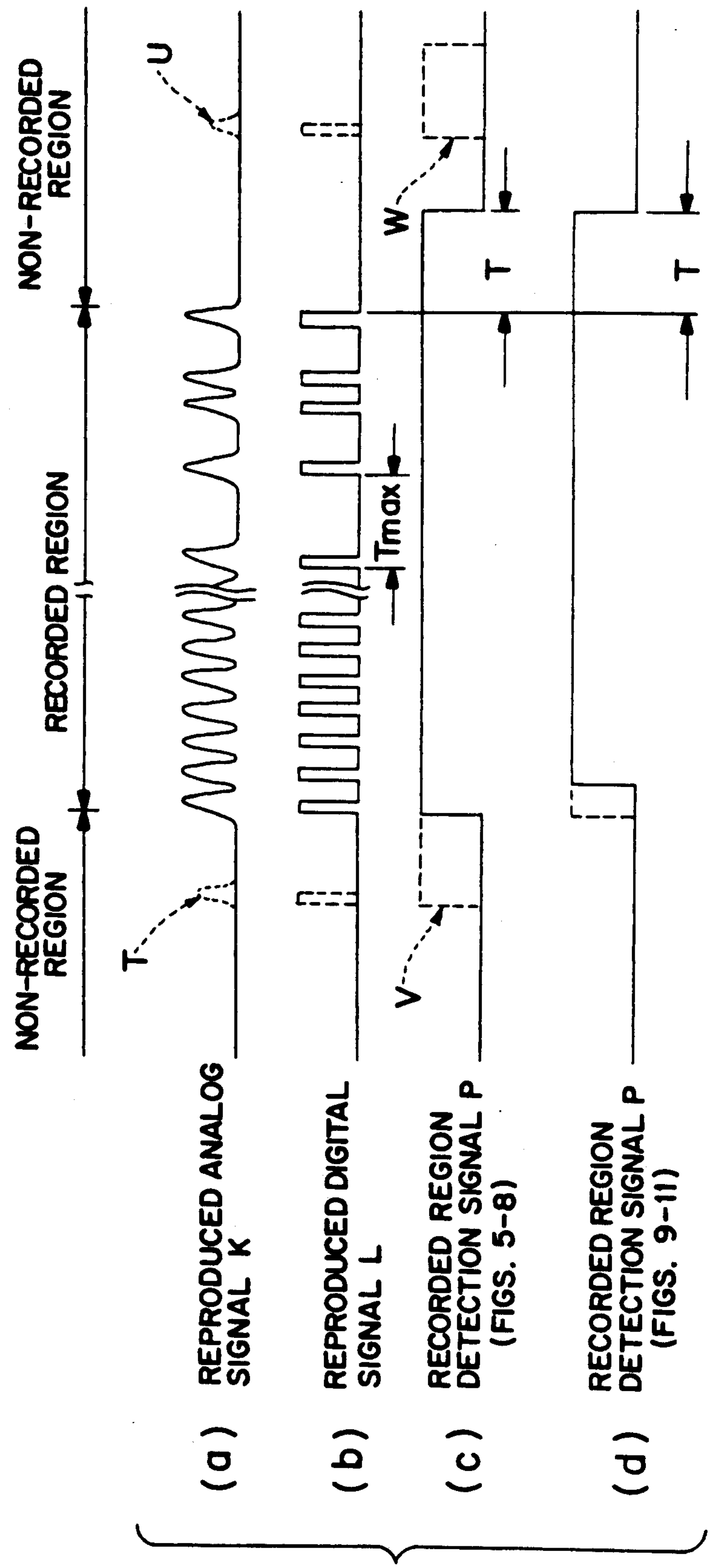
FIGS. 12(*a*)–(*d*) is a timing charts illustrating the timings of the signals in the regenerative circuits shown in FIGS. 5 and 9.
Figure 13:
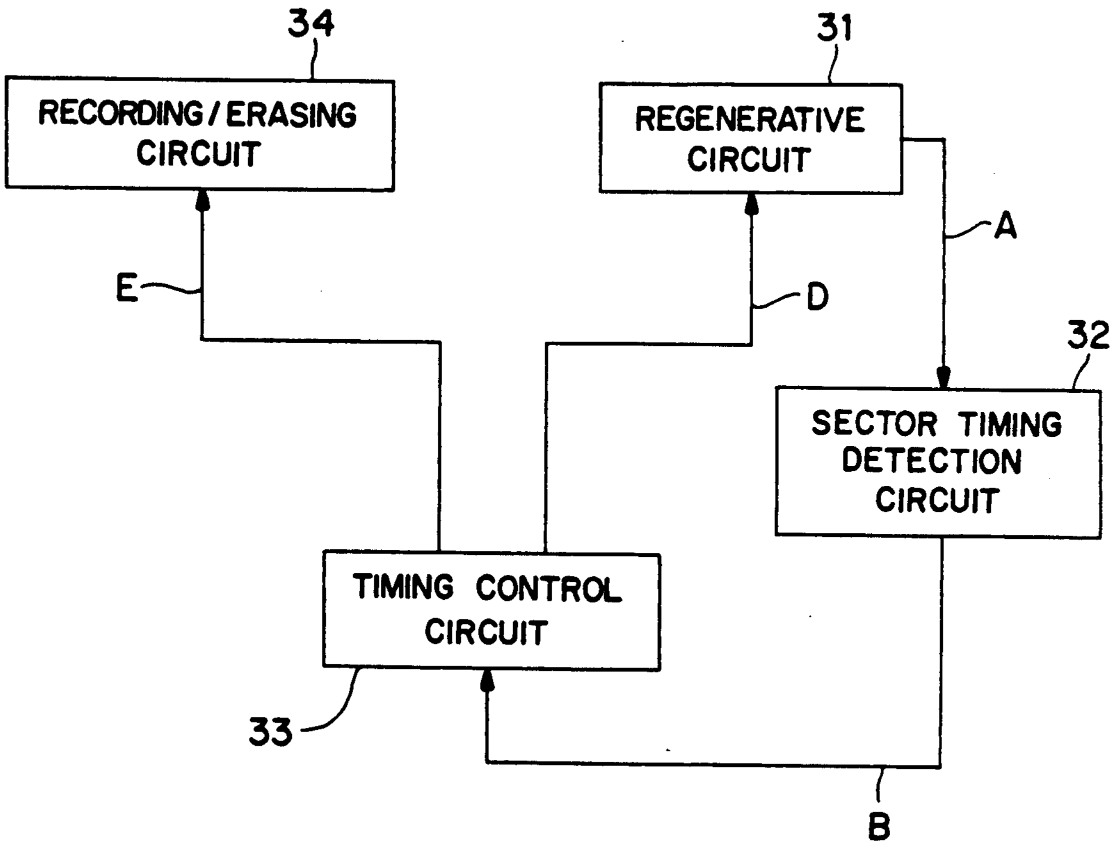
FIG. 13 is a block diagram showing another type of the regenerative circuit.

As shown in FIG. 12, when the recorded region of the disk 1 is scanned by the laser beam 3, pulses indicating information are present in the reproduced analog signal K. The time $\tau$ is set to become longer than the maximum pulse interval $T_{max}$ of the information pulse group. Therefore, the recorded region detection signal P, which is the output of the recorded region detecting circuit 17, becomes as shown in FIG. 12(*c*). Namely, the recorded region detection signal P substantially corresponds to the information pulse group of the analog signal K, i.e., to the recorded region of the disk 1.

Another preferred embodiment of the regenerative circuit 11 will be described with reference to FIGS. 9 to 12. This preferred embodiment can prevent the recorded region detection signal P from becoming High (as shown by broken lines V or W in FIG. 12(*c*)), or the reproduction of information from being erroneously conducted, even when a defective pulse T or U (FIG. 12(*a*)) is present in the reproduced analog signal K obtained from the non-recorded region.

Figure 9:
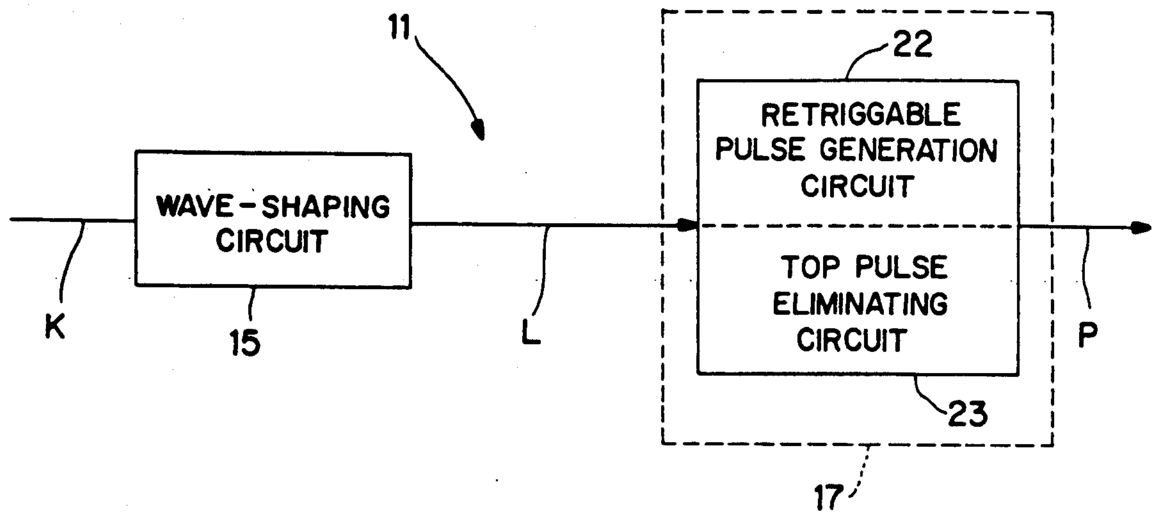
FIG. 9 is a block diagram showing another example of the regenerative circuit used in the circuit of FIG. 4.

As shown in FIG. 9, the recorded region detection circuit 17 in the regenerative circuit 11 comprises a retriggable pulse generation circuit 22 and a top pulse eliminating circuit 23. The top pulse eliminating circuit 23 invalidates the output of the retriggable pulse generation circuit 22 with respect to the first M pulses in the reproduced digital signal L.

Figure 10:
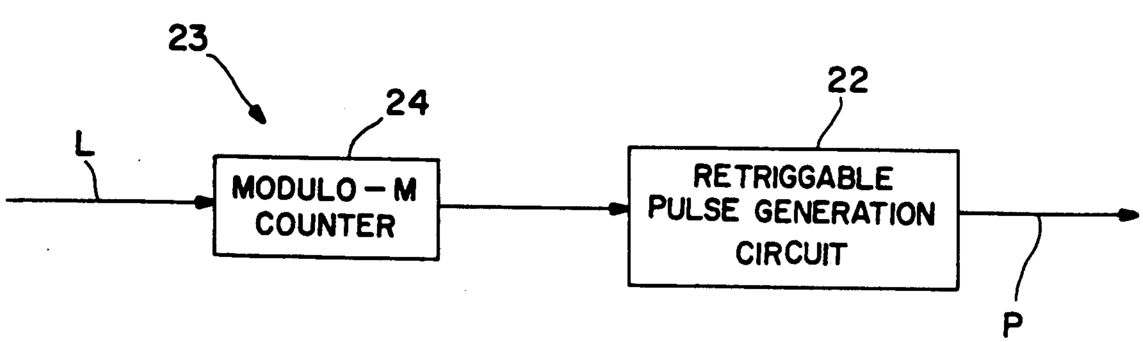
FIGS. 10 and 11 are block diagrams respectively showing an example of the top pulse eliminating circuit used in the regenerative circuit of FIG. 9.

A specific configuration of the top pulse eliminating circuit 23 is illustrated in FIG. 10. In front of the retriggable pulse generation circuit 22, an modulo-M counter 24 which functions as the top pulse eliminating circuit 23 is disposed, thereby eliminating the first M pulses in the reproduced digital signal L. An M-shift register may be used in lieu of the modulo-M counter 24.

Figure 11:
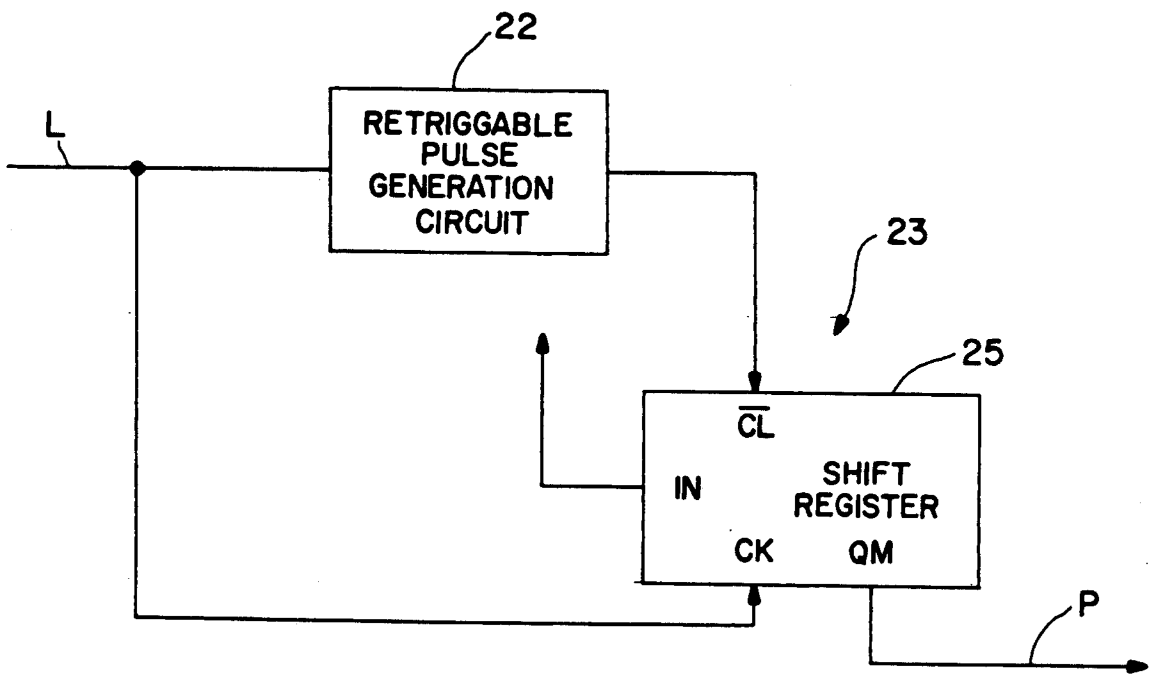

FIG. 11 shows another example of the top pulse eliminating circuit 23. A shift register 25 which functions as the top pulse eliminating circuit 23 is disposed in the rear stage of the retriggable pulse generation circuit 22. The output of the circuit 22 is coupled to the clear terminal $\overline{CL}$ of the shift register 25. The reproduced digital signal L is supplied to the clock terminal CK. In this example, the M-th shift output QM is used as the recorded region detection signal P.

Timing control in the above-mentioned example will be described taking the case as an example wherein M is one, namely, the output of the retriggable pulse generation circuit 22 is invalidated with respect to only the first one pulse in the reproduced digital signal L. When only one defect pulse T or U is present in the reproduced digital signal L obtained from the non-recorded region as shown in FIG. 12(*a*), the defect pulse T or U is invalidated by the top pulse eliminating circuit 23. Hence, the recorded region detection signal P will never become High in response to the defect pulse, as shown in FIG. 12(*d*). When the recorded region is scanned, the timing of activating the recorded region detection signal P High is delayed by one pulse. Such a delay of several pulses does not cause any malaffection. For example, the delay of several pulses in the read gate timing does not exert any bad influence upon the PLL, and therefore the reliability of the PLL will never fall.

In the foregoing description, an apparatus using a magnetooptical disk is described as one embodiment of the invention. The present invention is not restricted to this, but also applicable to other types of an apparatus such as those using write-once type optical disks, or phase transfer type optical disks.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an apparatus for recording and reproducing information on and from an optical disk, having an optical head wherein said optical disk is irradiated by a information bearing light beam, said apparatus comprising:

rotational driving means for rotating said optical disk;

reproduction means for reproducing information recorded on said optical disk to output reproduced signals;

position detection means for detecting the radial position of a region of said disk irradiated by said light beam;

first control means responsive to said position detection means for producing a first control signal and for controlling the rotational speed of said rotational driving means using said detected radial position;

judging means for judging whether or not said output reproduced signals are reproduced from a region of said optical disk where information has been already recorded;

second control means for producing a second control signal and for controlling the rotational speed of said rotational driving means, on the basis of said reproduced signals; and switch means responsive to said judging means for controlling said rotational driving means by said first control signal when said reproduced signals are not reproduced from a region where information has been already recorded, and controlled by said second control signal when said reproduced signals are reproduced from a region where information has been already recorded.

2. An apparatus according to claim 1, wherein said apparatus further comprises:

rotational speed detection means for detecting the rotational speed of said rotational driving means, and wherein said first control means produces said first control signal on the basis of said detected radial position and said detected rotational speed.

3. An apparatus according to claim 2, wherein said rotational speed detection means is responsive to said reproduced information signal from said reproduction means, and detects from said reproduced signals a region of said optical disk where information has been already recorded.

4. An apparatus according to claim 2, wherein said rotational speed detection means further comprises a retriggable pulse generation circuit.

5. An apparatus according to claim 4, wherein said rotational speed detection means further comprises a circuit for invalidating a top portion of said reproduced signals.

* * * * *

UNITED STATES PATENT AND TRADEMARK OFFICE
CERTIFICATE OF CORRECTION

PATENT NO. : 5,010,540

DATED : April 23, 1991

INVENTOR(S) : Hiroshi FUGI et al.

It is certified that error appears in the above-identified patent and that said Letters Patent is hereby corrected as shown below:

In the Drawings:

In Figure 12, the time T should be changed to the Greek character "$\tau$" in the recorded region detection signal P (at line C) and the recorded region detection signal P (at line D).

Signed and Sealed this

Sixth Day of October, 1992

*Attest:*

DOUGLAS B. COMER

*Attesting Officer*

*Acting Commissioner of Patents and Trademarks*